(12) United States Patent
Lewis

(10) Patent No.: US 6,992,873 B2
(45) Date of Patent: Jan. 31, 2006

(54) AUTOMATED AC LINE FILTER AND SURGE SUPPRESSION APPARATUS AND METHOD

(76) Inventor: Joseph S. Lewis, 506 Ethel St., Tularosa, NM (US) 88352

( * ) Notice: Subject to any disclaimer, the term of this patent is extended or adjusted under 35 U.S.C. 154(b) by 477 days.

(21) Appl. No.: 10/379,937

(22) Filed: Mar. 5, 2003

(65) Prior Publication Data

US 2004/0174652 A1    Sep. 9, 2004

(51) Int. Cl.
    *H02H 9/00*    (2006.01)
(52) U.S. Cl. ..................................................... 361/118
(58) Field of Classification Search ................. 361/118
    See application file for complete search history.

(56) References Cited

U.S. PATENT DOCUMENTS

| 4,023,071 | A | 5/1977 | Fussell |
| 4,587,588 | A | 5/1986 | Goldstein |
| 4,630,163 | A | 12/1986 | Cooper et al. |
| 4,675,772 | A | 6/1987 | Epstein |
| 4,870,528 | A | 9/1989 | Harford |
| 4,870,534 | A | 9/1989 | Harford |
| 5,153,806 | A | 10/1992 | Corey |
| 5,388,021 | A | 2/1995 | Stahl |
| 5,392,188 | A | 2/1995 | Epstein |
| 5,398,150 | A | 3/1995 | Standler |
| 5,614,770 | A * | 3/1997 | Suelzle ........................ 307/105 |
| 5,617,284 | A | 4/1997 | Paradise |
| 5,761,021 | A | 6/1998 | Yu |
| 5,786,974 | A | 7/1998 | Zaretsky |
| 5,818,672 | A | 10/1998 | Hilbe |
| 6,055,147 | A | 4/2000 | Jeffries et al. ............... 361/103 |
| 6,118,639 | A | 9/2000 | Goldstein ...................... 361/55 |
| 6,188,557 | B1 | 2/2001 | Chaudhry ..................... 361/111 |
| 6,229,682 | B1 | 5/2001 | Mechanic ..................... 361/111 |
| 6,388,852 | B1 | 5/2002 | Bobash ........................ 361/74 |
| 6,556,410 | B1 * | 4/2003 | Manning et al. ............. 361/118 |
| 2001/0055186 | A1 | 12/2001 | Christian, et al. |

* cited by examiner

*Primary Examiner*—Stephen W. Jackson
(74) *Attorney, Agent, or Firm*—Dennis F. Armijo; Andrea L. Mays

(57) ABSTRACT

A automated AC line filter and surge suppression apparatus 100 having an inductive current sense loop (ICSL) circuit 10 for sensing inductive current at a load and controlling the application of AC line filter 112 to an AC power line to the load. Current sensor 12 in series with the input line senses inductive load current. A first bridge rectifier 14 rectifies the sensed load current to a proportionate DC voltage, which triggers a switch 24. The output of switch 24 is fed into an opto-isolator 26, which in turn controls second switch 28. Switch 28 connects or disconnects AC line filter 112 from the system according to a predetermined sensed inductive current at the load. MOVs 102 and capacitive elements 104 provide continuous surge suppression protection to the load.

19 Claims, 13 Drawing Sheets

AUTOMATED AC LINE FILTER AND SURGE SUPPRESSION APPARATUS AND METHOD

BACKGROUND OF THE INVENTION

1. Field of the Invention (Technical Field)

The present invention relates generally to the field of alternating current (AC) line filters and surge suppression circuitry, and more particularly to the application of line filtering based upon a predetermined sensed inductive current at the load.

2. Background Art

The basic alternating current (AC) line filter is an inductive-capacitive (LC) filter circuit that is inserted into a power supply to filter out unwanted high-frequency interference present in the input line supply. Line filters also aid in the reduction of voltage spikes, or "surges", as well as aid in the elimination of radio frequency (RF) interference by the power supply. Line filters are typically placed before the transformer of a power supply to prevent these unwanted signals and spikes from reaching the load.

The difficulties encountered when AC voltage surges occur in power supplies are well known. Sudden spikes or dips in the input voltage are particularly problematic to sensitive circuitry, such as digital integrated circuits, but are also problematic to larger scale circuitry. A change in the power supply output voltage, particularly sudden increases in output voltage, may damage or destroy circuit components. Most power supplies are regulated to prevent or minimize the effect of power surges as well as to maintain a constant output voltage regardless of load.

Metal oxide varistors (MOVs) and other transient voltage surge suppression (TVSS) technology, such as those manufactured by Redivolt® and Innovative Technologies, are commonly used for surge suppression. Examples of surge protection circuitry can be found in U.S. Pat. No. 6,229,682 to Mechanic, entitled, "Transient Voltage Surge Suppressor;" U.S. Pat. No. 6,055,147 to Jeffries et al., entitled, "Apparatus for Providing Independent Over-Current Protection to a Plurality of Electrical Devices and Transient-Voltage Suppression System Employing the Apparatus;" U.S. Pat. No. 5,761,021 to Yu, entitled, "Voltage Surge Suppression Device;" U.S. Pat. No. 5,617,284 to Paradise, entitled, "Power Surge Protection Apparatus and Method;" U.S. Pat. No. 5,388,021 to Stahl, entitled, "Voltage Surge Suppression Power Circuits;" U.S. Pat. No. 4,023,071 to Fussell, entitled, "Transient and Surge Protection Apparatus;" U.S. Pat. No. 5,153,806 to Corey, entitled, "Transient Surge Suppressor and Alarm Signal Circuit;" U.S. Pat. No. 4,587,588 to Goldstein, entitled, "Power Line Transient Surge Suppressor;" U.S. Patent Application Pub. No. 0055186 to Wodrich et al., entitled, "Zero Threshold Surge Suppressor;" U.S. Pat. No. 6,118,639 to Goldstein, entitled, "Fast Acting Disconnect System For Protecting Surge Suppressors and Connected Utilization Equipment From Power Line Overvoltages;" U.S. Pat. No. 5,786,974 to Zaretsky, entitled, "Apparatus For and Method of Suppressing Power Surges Utilizing Electrical Striplines;" U.S. Pat. No. 4,587,588 to Goldstein, entitled, "Power Line Transient Surge Suppressor;" U.S. Pat. No. 4,630,163 to Cooper et al., entitled, "Method and Apparatus for a Transient-Suppression Network;" U.S. Pat. No. 4,870,534 to Harford, entitled, "Power Line Surge Suppressor;" U.S. Pat. No. 5,398,150 to Standler, entitled, "Coordinated Electric Surge Suppressor with Means for Suppressing Oscillatory Transient Overvoltages;" U.S. Pat. No. 4,587,588 to Goldstein, entitled, "Power Line Transient Surge Suppressor;" U.S. Pat. No. 6,188,557 to Chaudhry, entitled, "Surge Suppressor;" and U.S. Pat. No. 4,870,528 to Harford, entitled, "Power Line Surge Suppressor."

Additional AC filtering is achieved by including capacitive filtering in the line. Capacitive filters further aid in the electrical performance of various inductive loads such as pumps, fans, air conditioning units, refrigeration units, etc., because the capacitive reactance of the filter offsets the inductive load reactance to balance the phase variation caused by the inductive load. Examples of combination surge protection and line filtering circuitry can be found in U.S. Pat. No. 5,392,188 to Epstein, entitled, "Power Surge Transient Voltage Protection and Filtering Circuit Having Current Controlling Characteristics;" and U.S. Pat. No. 4,675,772 to Epstein, entitled, "Protector Network for A-C Equipment."

Surge protection is useful on a continuous basis for equipment connected to a power line. However, during load non-operation periods, capacitive line filtering may not be necessary and in some cases may add interference back into the electrical supply. The capacitive reactance of the filter can cause harmonic distortion on the line because the normal inductive load is not present to absorb, or cancel, the capacitive reactance. Prior art surge suppression and filtering circuits do not address inductive load disparities that occur due to varying operating parameters of the load. It would be useful if such circuitry were able to sense an inductive current at the load and provide line filtering only when inductive current was present.

Attempts have been made to sense current within surge protection circuitry devices, but not for the purpose of controlling capacitive filtering on the line. Examples include U.S. Pat. No. 4,870,528 to Harford, which discloses a surge suppression circuit that includes a sensing circuit for sensing the charging current to a capacitor used for storing relatively high-energy surges. However, this patent addresses the need for additional energy storage capacity in a particularly high energy surge condition and allows current flow to an additional capacitor upon sensing current through a simple diode and rectifier configuration. Harford does not address the need for control of line filtering. U.S. Pat. No. 5,818,672 to Hilbe, entitled, "Ground Loop Current Suppressor" discloses a sensing transformer used for sensing ground loops in electrical equipment interconnections. The sensed ground loop current is used to induce a second current for counteracting the ground loop current. U.S. Pat. No. 6,388,852 to Bobash, entitled, "Flicker Protection Circuit" discloses a circuit for removing AC power to a load upon sensing an interruption in the power supply by an auto-reset watchdog circuit.

Problems of varying load-operating parameters have also been addressed with motor control circuitry that is used to change the running characteristics of the inductive load. Examples include variable frequency drives (VFDs), and soft starts which do not allow full transfer of power upon start-up but instead slowly ramp up power to the load. Although such control circuitry may provide significant energy savings, it often requires changing the frequency of and/or the voltage supply to the load and does not address the need for control of the application of line filtering.

The present invention overcomes the limitations of the prior art by applying AC line filtering only when the load is operational. The inventive method and apparatus monitors the inductive load via an inductive current sense loop (ICSL) circuit to control the application of line filtering according to the presence or absence of inductive current at the load. The ICSL circuit monitors current flux from an inductive load to determine if capacitive AC line filtering should be added to the circuit. If the inductive current benefits by the addition of filtering elements, then the ICSL circuit remains energized to provide such filtering elements. When the inductive load is not operational, the ICSL circuit automatically switches the line filtering elements to an "off" position, thereby removing line filtering from the system. The present invention also combines automated line filtering with surge suppression circuitry. The surge suppression circuitry is in continuous electrical communication with the power line and load for continuous provision of surge protection.

SUMMARY OF THE INVENTION
(DISCLOSURE OF THE INVENTION)

The present invention is an automated AC line filter and surge suppression apparatus comprising surge suppression circuitry in continuous electrical communication with an AC power line to a load, and an inductive current sense loop (ICSL) circuit for controlling the application of line filtering. The inductive current sense loop circuit comprises a current sensor for sensing current at the load and a switching mechanism in electrical communication with the current sensor. The switching mechanism is in electrical communication with an AC line filter. The switching mechanism applies AC line filtering only when a predetermined amount of current is sensed at the load by the current sensor.

The surge suppression circuitry of the present invention preferably comprises one or more MOVs and capacitors. The AC line filter preferably comprises a capacitance in the range of 5 $\mu$F to 285 $\mu$F.

The current sensor is preferably a current transformer in line with an AC power line to the load. The switching mechanism preferably comprises a first switch, a level converter, and a second switch. A bridge rectifier connected to the output of the current sensor provides the voltage input to the first switch, preferably a timer IC configured as a bi-stable binary flip-flop. Alternatively, the first switch comprises a flip-flop, bilateral switch, counter, or combination thereof. The level converter is preferably an opto-isolator, or alternatively, a transistor, digital isolator, silicon control rectifier, solid-state relay, photo-transistor, or combination thereof. The second switch preferably comprises a logic triac. In the alternative, the second switch comprises an electromechanical relay, solid-state relay, power triac, or combination thereof.

The present invention is further a method of automatically providing AC line filtering to an AC power line to a load according to sensed current at the load. The method comprises the steps of providing an AC line filter; monitoring current at a load with a current sensor in electrical communication with an AC power line to the load; and applying AC line filtering to the load based upon the output from the current sensor. The step of applying AC line filtering comprises switching AC line filtering into or out of electrical communication with the AC power line to the load based upon the output from the current sensor with a switching mechanism.

A primary object of the present invention is to provide AC line current filtering only when inductive current is present at the load. Another primary object of the present invention is to combine the benefits of surge suppression with line filtering.

A primary advantage of the present invention is a reduction of power usage by the load. Another primary advantage of the present invention is the reduction of load start-up demand for power. Still another primary advantage of the present invention is an improvement of the load phase power factor. Yet another primary advantage of the present invention is the reduction of line transient anomalies and the provision of a more constant AC waveform. Another advantage of the present invention is the reduction of noise and total harmonic distortion (THD) at the load. Still another primary advantage of the present invention is that it extends the useful life of the load. Still yet another primary advantage of the present invention is that it is cost-effective to manufacture, utilizing available components. And, another primary advantage of the present invention is that it can be used in conjunction with a wide variety of inductive load equipment.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate a preferred embodiment of the present invention and, together with the description, serve to explain the principles of the invention. The drawings are not to be construed as limiting the invention.

DESCRIPTION OF THE PREFERRED EMBODIMENTS (BEST MODES FOR CARRYING OUT THE INVENTION)

Figure 1:
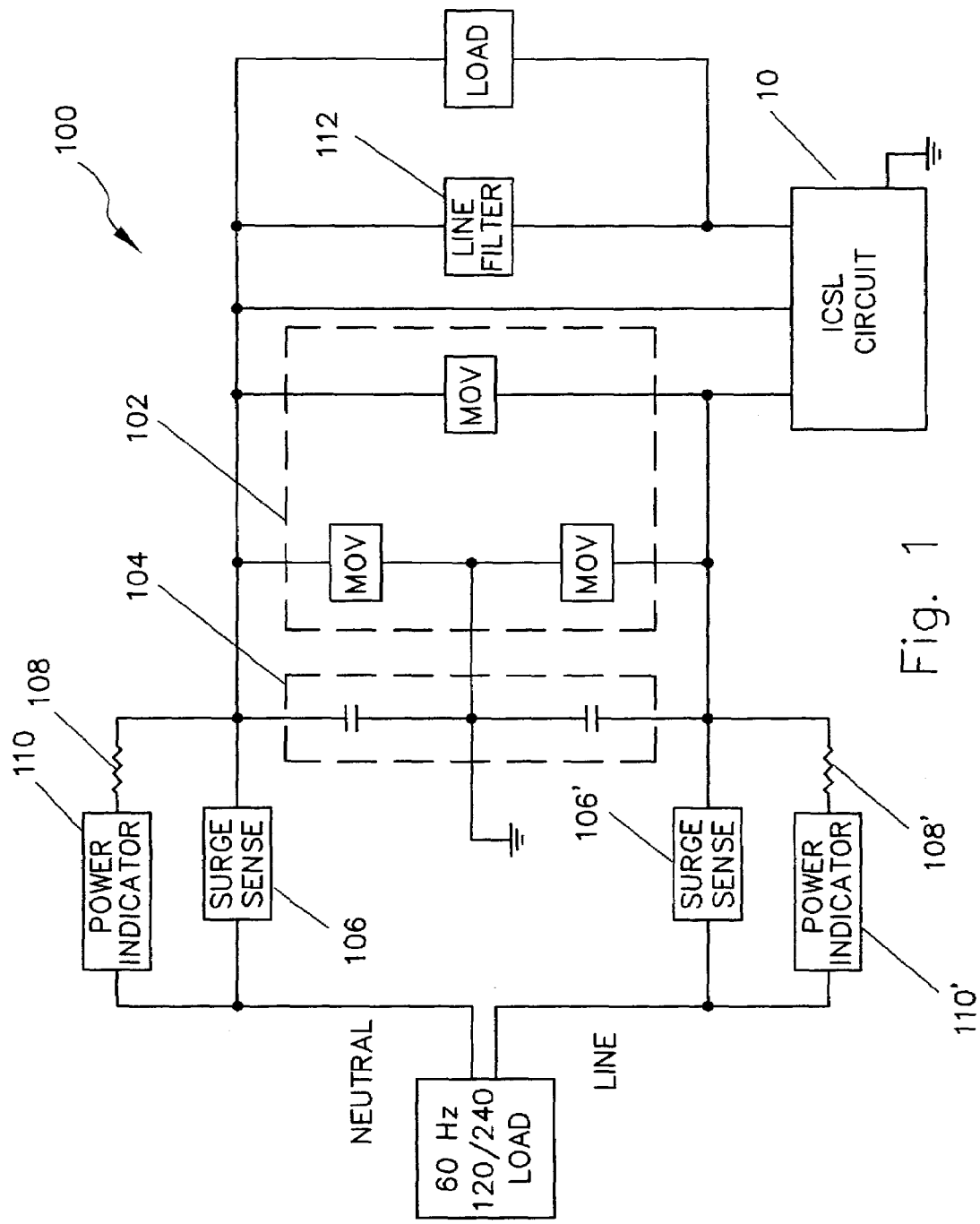
FIG. 1 is the automated AC line filtering and surge suppression apparatus of the present invention.
Figure 2A:
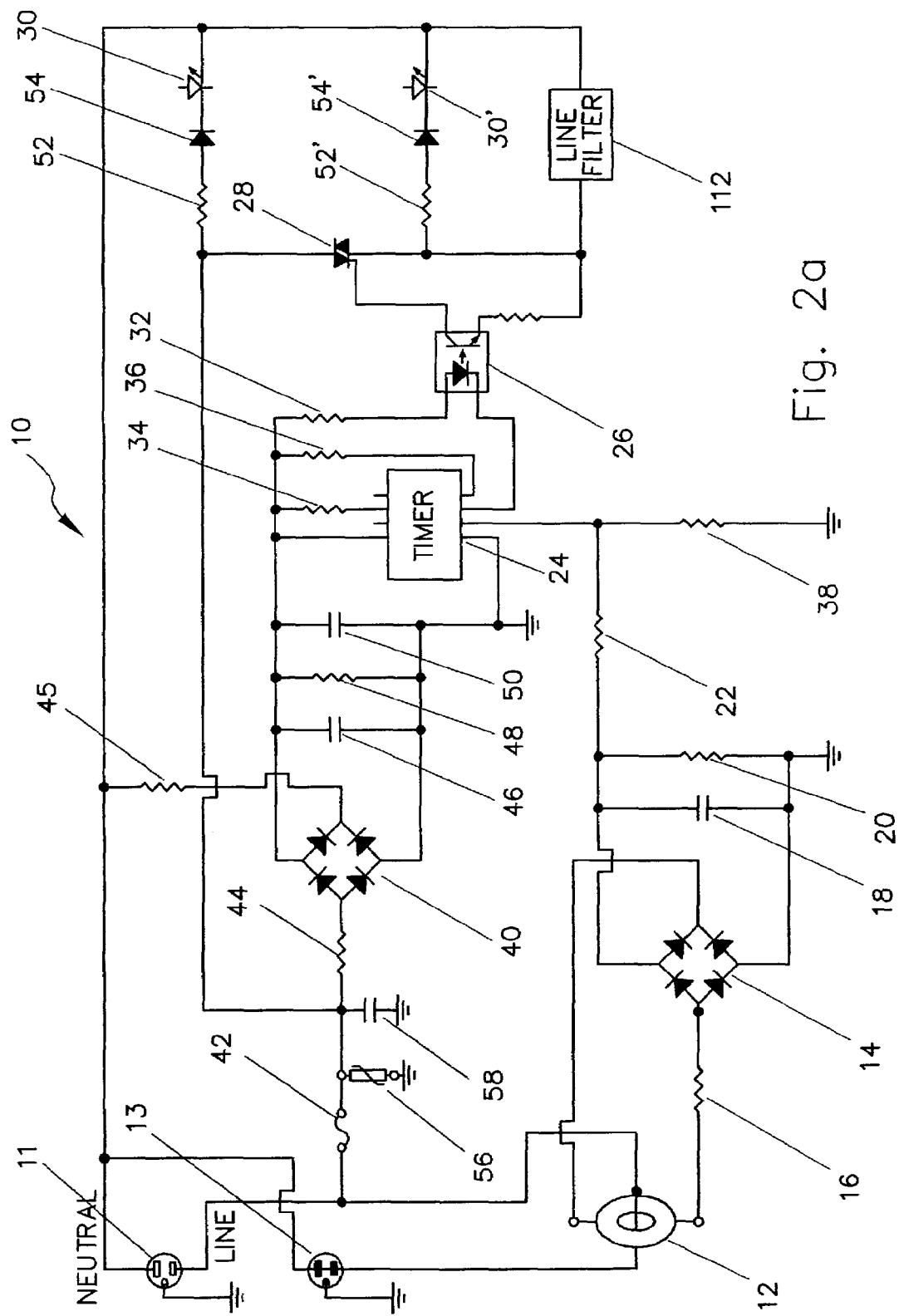
FIG. 2a is the preferred embodiment of the inductive current sense loop (ICSL) circuit of the present invention.
Figure 2B:
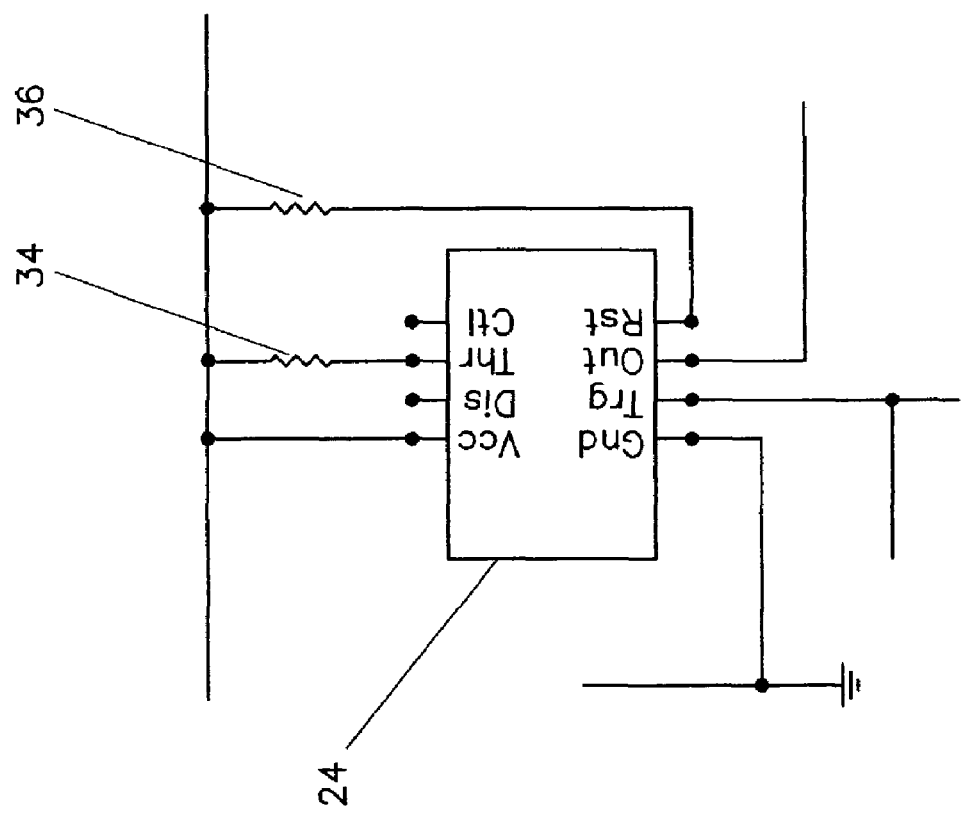
FIG. 2b is an expanded view of the timer of FIG. 2a defining the IC input and output pins.

Referring in combination to FIG. 1, FIG. 2a and FIG. 2b, a schematic of the automated line filter and surge suppression apparatus 100 of the present invention is shown. Surge suppression is provided continuously to the load by surge suppression circuitry, preferably MOVs 102 and capacitance elements 104. An ICSL circuit 10 provides AC line filtering via line filter 112 only when current is sensed at the load.

Surge suppression is accomplished by a plurality of MOVs 102 connected between line and ground, neutral and ground, and line and neutral. MOVs are also provided line to line where applicable, for example when the power source is 240V single phase. While three MOVs are depicted in FIG. 1 for the purpose of surge suppression, it will be understood by those of skill in the art that the number of MOVs can be varied according to the particular load, in accordance with the principles of the invention. Preferably, a minimum of one MOV is connected neutral to ground, one MOV connected line to neutral, one MOV connected line to ground, and one MOV connected line to line if appropriate, depending upon the voltage and phase configuration of the power supply. In addition to MOVs 102, surge suppression capacitive elements 104 are connected neutral to ground and line to ground to provide a total capacitance value appropriate to the load application. Capacitance is also provided line to line where appropriate to the power source configuration.

Surge sensing elements 106, 106' such as fuses, thermal sensing devices, or a combination of both, at the power source open the circuit to the load in the event of a current overload. Series resistances 108, 108' limit current to indicators 110, 110', preferably light sources, which remain lighted to indicate an available power source to the load. Should sensing elements 106, 106' open in response to an overload condition, indicators 110, 110' cease to be illuminated indicating to the user that power is not available to the load.

In addition to surge suppression components, line filter 112 provides AC line filtering to the load. Line filter 112 filters undesired frequencies from the AC supply and provides a reactive component to the load impedance to balance the reactive component found in inductive loads such as pumps, fans, air conditioning units, and refrigeration units. According to convention, the capacitance value of AC line filter 112 is dependent upon the particular load for which the apparatus 100 is to be used, such value likely ranging from 5 $\mu$F to 285 $\mu$F. An optional decoupling capacitance, ranging in value from 0.001 $\mu$F to 0.1 $\mu$F, (not shown) aids in the reduction of noise associated with digital switching.

Referring to FIG. 2a and FIG. 2b, a schematic of the inductive current sense loop (ICSL) circuit 10 of the line filter and surge suppression apparatus of FIG. 1 is shown. ICSL circuit 10 controls the application of line filter 112 to the power source. Line filtering is applied, or switched "on", by a switch mechanism only upon sensing an inductive current at the load. When switched "on", the line filtering is in electrical communication with the AC power line to the load.

A male connector 11 is provided in ICSL circuit 10 for connection to the power outlet and female connector 13 is provided for connection to the load, for example a refrigerator plug. Current sensor 12, a current transformer, is connected in series with the line between male connector 11 and female connector 13. When an inductive load is present, current sensor 12 senses the current at the load. Current sensor 12 is of a size appropriate to sense a predetermined current that is typical of a particular load. For example, a single phase 120V home appliance may operate on approximately 800 mA of current, while a large load, such as a 50 horsepower motor, may require as much as 50 A of current. The sensed current is rectified with bridge rectifier 14, thereby providing a DC signal. Input line resistance 16 interfaces with bridge rectifier 14 and dampens particular over-current conditions that might occur, such as when the load is being shorted or overloaded. Capacitance 18 and resistance 20 comprise a timing network to filter AC ripple from the DC voltage of bridge rectifier 14.

The DC voltage from rectifier 14, through resistances 22 and 38, operates as the trigger for switch 24, a timer IC such as the conventional CMOS 555 timer connected in a switch configuration. (See also FIG. 2b) Switch 24 is configured so that it does not operate in an astable or monostable mode, but is instead configured to perform in the manner of a bi-stable binary flip-flop, so that whenever an input exists from the current sense loop bridge rectifier 14 the switch is triggered into the "on" position, and whenever there is no input from rectifier 14 the switch is forced into the "off" position. Once triggered, switch 24 remains in the "on" position until inductive current is no longer sensed at the load at which point it is switched "off". When in the "off" position, switch 24 remains "off" until current is again sensed by current sensor 12. Switch 24 alternatively comprises a CMOS flip-flop IC, such as a dual resettable flip-flop or a dual D-type flip-flop, a quad bilateral switch, or a counter IC. However, the low power requirement and low heat generation of a CMOS 555 timer are preferable.

During load operating conditions, switch 24 is forced into the "on" state with the output held low. The low output from switch 24 energizes opto-isolator 26, which operates as the level converter between the output of switch 24 and the input of second switch 28 and also provides electrical isolation between switch 24 and switch 28. Opto-isolator 26 provides a smooth transition from the small current (mA) output of switch 24 to that required to trigger the gate of second switch 28.

The iso-amplifier output of opto-isolator 26 energizes second switch 28, such as a logic triac, which in turn controls the application of line filter 112 to the power supply. When the load is operational and current sensor 12 senses inductive current, second switch 28 provides electrical continuity with line filter 112 so that line filtering is applied, or "on". When current sensor 12 does not sense inductive current, electrical continuity with line filter 112 is interrupted by second switch 28, thereby turning line filter 112 "off".

The function of opto-isolator 26 is alternatively provided by one or more transistors, such as NPN transistors, digital isolators, silicon control rectifiers (SCRs), solid-state relays, and photo-transistors, alone or in combination. Switch 28 is alternatively an electromechanical or solid-state relay, or power triac.

When switch 28 provides electrical continuity with line filter 112 due to a load current-sense condition, an indicator 30—such as a bicolor LED illustrated as 30 and 30'—glows to indicate that AC line filtering is present. When inductive load current is not sensed through current sensor 12, indicator 30 glows a different color than in the sensed current condition, to indicate no AC line filtering is present. A single indicator 30, 30' is illustrated for a 120V single-phase application in FIG. 2a. However, a pair of indicators could be used in a 240V application, where one indicator is provided on each line.

To provide an indication of the presence or absence of line filtering, the red lead of indicator 30 is connected to the line side of fuse, or thermal cutoff device, 42, while the green lead of indicator 30' is connected to the switched side of line filter 112. The black lead of indicator 30, 30' is connected to the neutral line. The red and green leads of indicator 30, 30' are connected through a voltage divider half-wave rectifying network consisting of resistances 52, 52' in series with diodes 54, 54'. Although a bicolor LED is depicted in FIG. 2a for presenting information regarding the presence or absence of AC line filtering, it will of course be understood that other types of illumination or indicator devices can be used in accordance with the invention to indicate the presence or absence of line filtering.

In addition to indicator 30, an optional fault indicator (not shown), such as an LED, neon, or other light source, indicates a fault condition in the ICSL circuit 10 such as the absence of power on the AC power line.

A second bridge rectifier 40 rectifies line voltage and provides a small DC power supply. Line current is fed to bridge rectifier 40 through a surge-sensing device 42 such as a thermal sensing device or a fuse. Resistance 44 reduces the line voltage to bridge rectifier 40. Neutral is fed to rectifier 40 through resistance 45. Bridge rectifier 40 supplies the reference voltage to switch 24 and the reference voltage to opto-isolator 26 through resistance 32. Capacitances 46 and 50 together with resistance 48, remove filtering ripple from the output of bridge rectifier 40. The negative or the grounded side of bridge rectifier 40 is tied common to the grounded side of bridge rectifier 14 so that both rectifiers operate at the same potential. Surge suppression for ICSL circuit 10 is provided by MOV 56 and capacitance 58, although a multitude of component configurations can be substituted for MOV 56 and capacitance 58 to provide surge suppression.

When the load discontinues or disengages from normal operation, for example, when a refrigerator achieves a pre-programmed temperature and ceases drawing power for refrigeration, current sensor 12 no longer senses an inductive current. Once inductive current is no longer sensed at the load, bridge rectifier 14 will discontinue the rectifying process. Discontinuation of rectification is sensed by the trigger input to switch 24 causing switch 24 to "reset". This occurs because the active low reset input to switch 24 is tied high through resistance 36 to the output of second bridge rectifier 40. The threshold input to switch 24 is also tied high through resistance 34. When the trigger input is low, the output of switch 24 becomes high, ceasing operation of opto-isolator 26, which then changes the state of switch 28 to disconnect line filter 112 from the system.

In addition to switching line filter 112 on and off according to sensed inductive load current, the present invention allows for the added feature of selecting line filter capacitance values appropriate to the sensed load via an optional inductive current comparator stage (not shown). This additional stage is used for selecting additional capacitive filtering under higher inductive load demands and is particularly useful in three-phase applications.

The present invention as depicted in FIGS. 1, 2a and 2b is preferably comprised of a circuit board upon which the ICSL circuitry as well as filter elements, surge suppression components, fuses or thermal cutoffs, and other components are located. The board is preferably enclosed in a standard PVC plastic or heavy UL plastic enclosure, or is alternatively enclosed in a metal enclosure. Preferably the enclosure serves as a heat sink for the circuitry within. Depending upon the application, the device includes plug-in ports for the electrical hook-ups rated to the load specifications. Alternatively, the hook-ups are standard stranded electrical wire for both input and output.

The present invention has application to a variety of inductive load equipment such as air conditioners, motors, fans, pumps, compressors, and the like. The invention can be adapted for various voltage configurations, such as 120V and 240V single-phase, 240V three-phase and 480V three-phase configurations. For three-phase applications an ICSL circuit is provided for each line.

EXAMPLES

Application and benefits of the present invention were demonstrated in a series of tests. Implementation of the present invention on an AC power line to a load resulted in significant energy savings.

Test 1

In a first test, voltage, current and power factor measurements were taken on a 480V, 70.5 A, 50 horsepower motor operating at 830 rpm, used for driving an oil well pump. Measurements were taken both with and without the present invention implemented in the system. Measurements were taken over a time period of sixty minutes with a DataLogger™ measurement device. Test results without the present invention implemented in the system are summarized in Tables 1–4 below.

TABLE 1

Measurements Without Automated AC Line Filter and Surge Suppression Apparatus

| Phase | Voltage (V) | | | Power Factor (%) | | |
| --- | --- | --- | --- | --- | --- | --- |
| | Minimum | Maximum | Average | Minimum | Maximum | Average |
| A–B Phase | 461.00 | 487.00 | 472.85 | −95.31 | 49.16 | −61.03 |
| B–C Phase | 461.16 | 487.81 | 472.98 | −96.82 | 44.18 | −64.92 |
| C–A Phase | 459.07 | 487.99 | 472.12 | −96.43 | 49.09 | −62.60 |

TABLE 2

Measurements Without Automated AC Line
Filter and Surge Suppression Apparatus

| | Current (A) | | |
|---|---|---|---|
| Phase | Minimum | Maximum | Average |
| A Phase | 17.82 | 49.91 | 31.01 |
| B Phase | 17.65 | 49.64 | 30.76 |
| C Phase | 17.62 | 50.66 | 31.29 |

TABLE 3

Motor Operating Parameters
Without Automated AC Line Filter and
Surge Suppression Apparatus

| | |
|---|---|
| Frequency (Hz) | 60.00 |
| Total True Power Factor (%) | −64.85 |
| Neutral Current (A) | 0.00 |
| Total Demand (KWH) | 17.89 |
| Motor Temperature, Winding (° F.) | 101 |
| Motor Temperature, Skin (° F.) | 87 |

TABLE 4

Power Summary Without Automated AC Line
Filter and Surge Suppression Apparatus

| | Average | Instantaneous |
|---|---|---|
| Total Real Power (KWH) | 18.42 | 35.55 |
| Total Reactive Power (KVARH) | 12.38 | 10.94 |

Test results on the same motor with the present invention implemented in the system are summarized in Tables 5–8 below.

TABLE 5

Measurements With Automated AC Line Filter and Surge
Suppression Apparatus

| | Voltage (V) | | | Power Factor (%) | | |
|---|---|---|---|---|---|---|
| Phase | Minimum | Maximum | Average | Minimum | Maximum | Average |
| A–B Phase | 466.18 | 492.08 | 479.26 | −99.44 | 67.04 | −67.69 |
| B–C Phase | 465.76 | 491.51 | 478.83 | −99.76 | 62.80 | −71.41 |
| C–A Phase | 464.09 | 491.68 | 478.00 | −99.68 | 69.36 | −69.99 |

TABLE 6

Measurements With Automated AC Line
Filter and Surge Suppression Apparatus

| | Current (A) | | |
|---|---|---|---|
| Phase | Minimum | Maximum | Average |
| A Phase | 8.15 | 48.87 | 24.26 |
| B Phase | 8.51 | 49.10 | 24.46 |
| C Phase | 8.09 | 49.85 | 24.60 |

TABLE 7

Motor Operating Parameters
With Automated AC Line Filter and
Surge Suppression Apparatus

| | |
|---|---|
| Frequency (Hz) | 60.00 |
| Total True Power Factor (%) | −66.77 |
| Neutral Current (A) | 0.00 |
| Total Demand (KWH) | 16.54 |
| *Motor Temperature, Winding (° F.) | 107 |
| *Motor Temperature, Skin (° F.) | 90 |

*Ambient temperature 12° F. higher than testing performed in Tables 1–4.

TABLE 8

Power Summary With Automated AC Line Filter
and Surge Suppression Apparatus

| | Average | Instantaneous |
|---|---|---|
| Total Real Power (KWH) | 16.80 | 4.67 |
| Total Reactive Power (KVARH) | 3.99 | 5.46 |

A comparison of the results without the apparatus of the present invention (Tables 1–4) with the results when the apparatus of the present invention was implemented in the system (Tables 5–8) revealed a significant energy savings. Implementation of the present invention resulted in reduced current at the load. Total real power, total reactive power, and total demand for power by the load were also reduced. This is supported by the formula for determining kilowatt-hours:

$$Kwh = \frac{E \cdot I \cdot PF \cdot 1.73 \cdot t}{1000}, \quad (1)$$

where E is voltage in volts, I is current in amperes, PF is the power factor and t is time in hours.

Test 2

A second test was performed on the identical motor as in the test described immediately above, on a different day and time. Referring to FIGS. 3–10, measurements of voltage, current, total real power and total reactive power were plotted as a function of time, first without the automated AC line filter and surge suppression apparatus, then with the automated AC line filter and surge suppression apparatus implemented in the system. Measurements were taken over a one-hour period of time.

Figure 3:
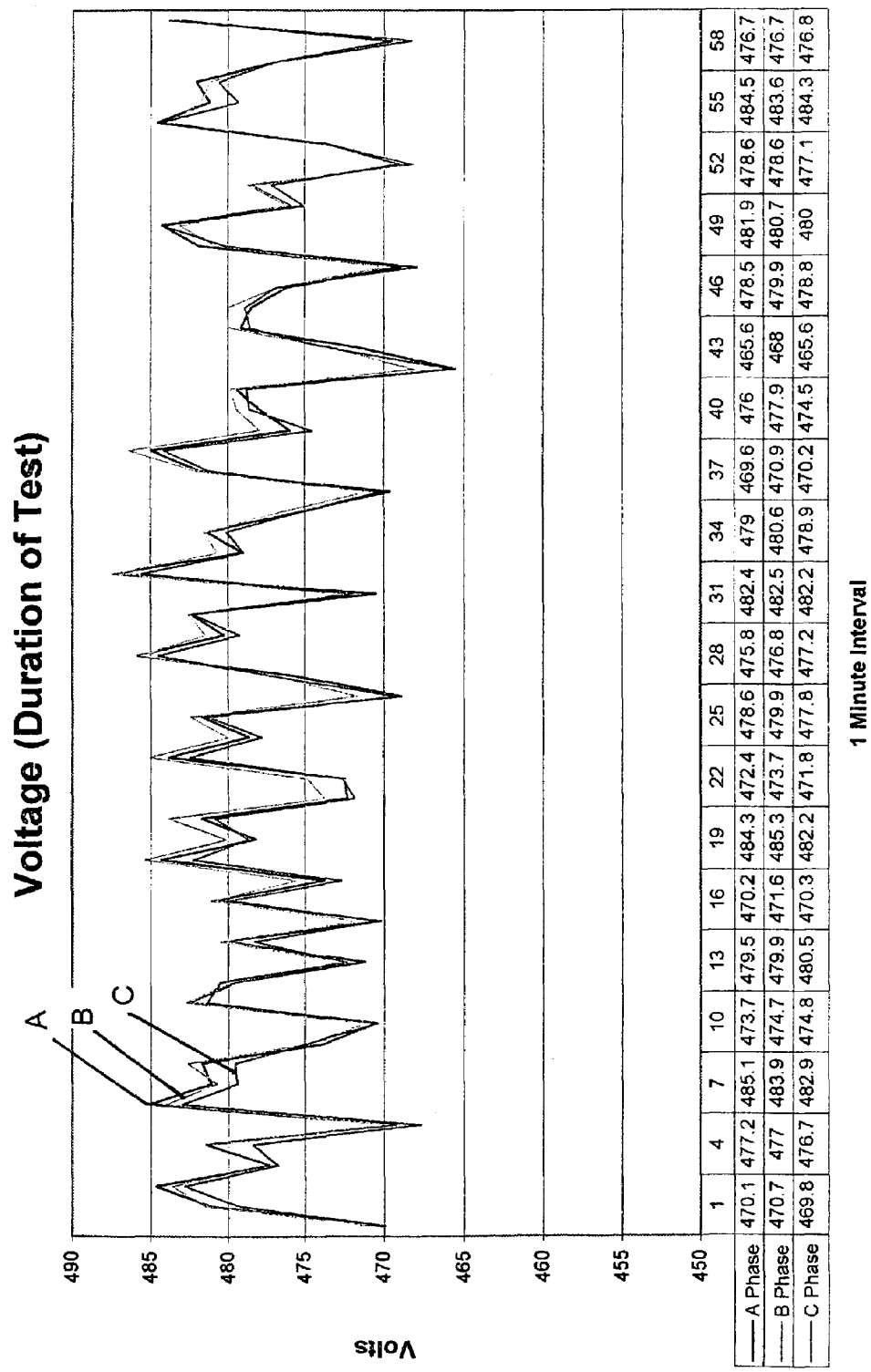
FIG. 3 is a plot of voltage (V) as a function of time (min) for three phases of a power supply to a 50 horsepower motor over a one-hour time period.
Figure 4:
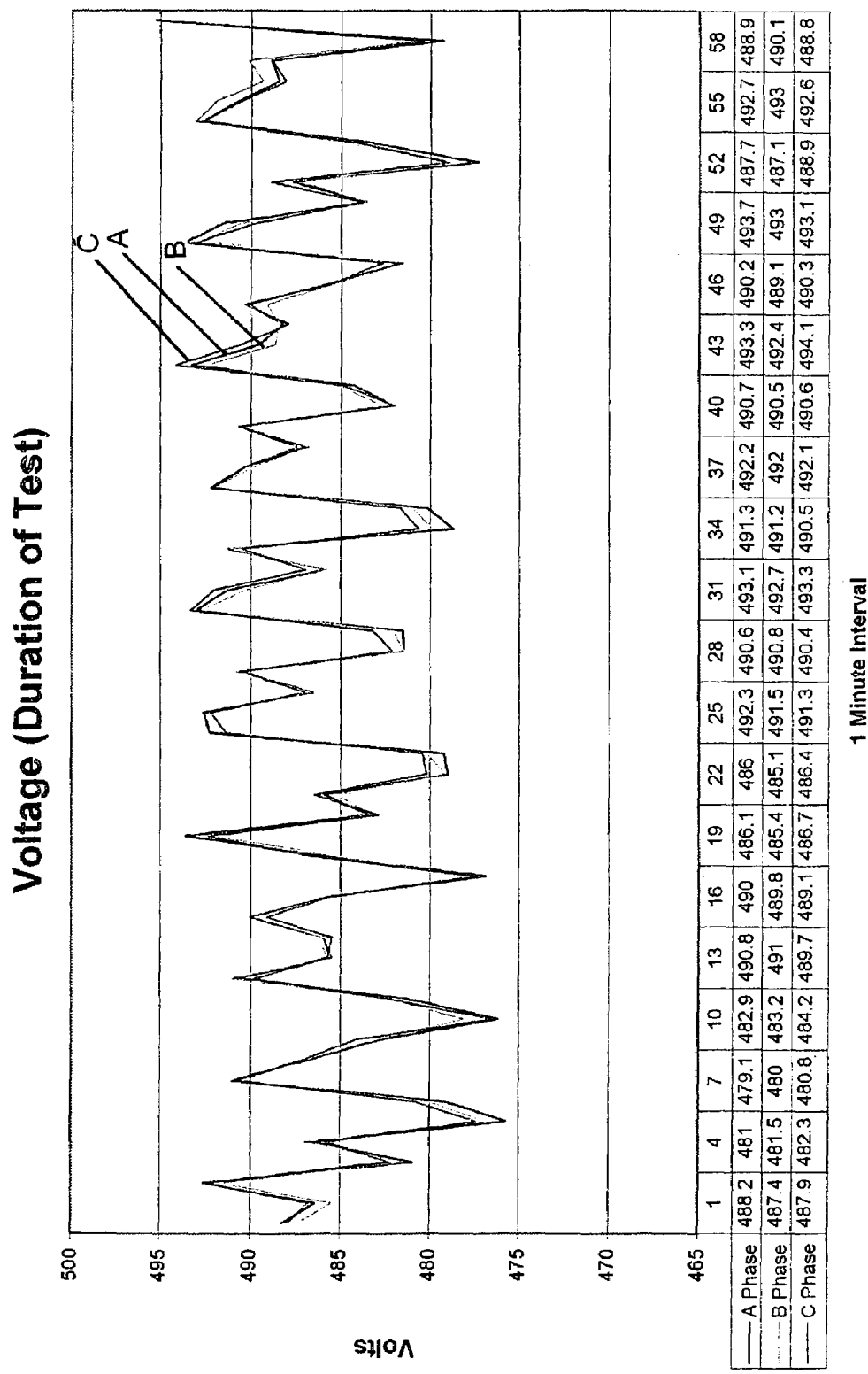
FIG. 4 is a plot of voltage (V) as a function of time (min) for three phases of a power supply to the 50 horsepower motor of FIG. 3 over a one-hour time period with the present invention of FIGS. 1 and 2 implemented.

Referring to FIGS. 3 and 4, voltage measurements across each of three phases are plotted in volts as a function of time. FIG. 3 shows the voltage across the A, B and C phases before implementation of the present invention. Numerical averages are provided directly beneath the plots for each three-minute interval. These same measurements were then taken with the automated AC line filter and surge suppression apparatus implemented in the system. The results are depicted in FIG. 4. An overall comparison of voltage on each phase without implementation of the inventive apparatus (FIG. 3) to voltage with implementation of the inventive apparatus (FIG. 4) reveal a larger voltage at the load with implementation of the present invention, and reduced voltage variance between the three phases.

Figure 5:
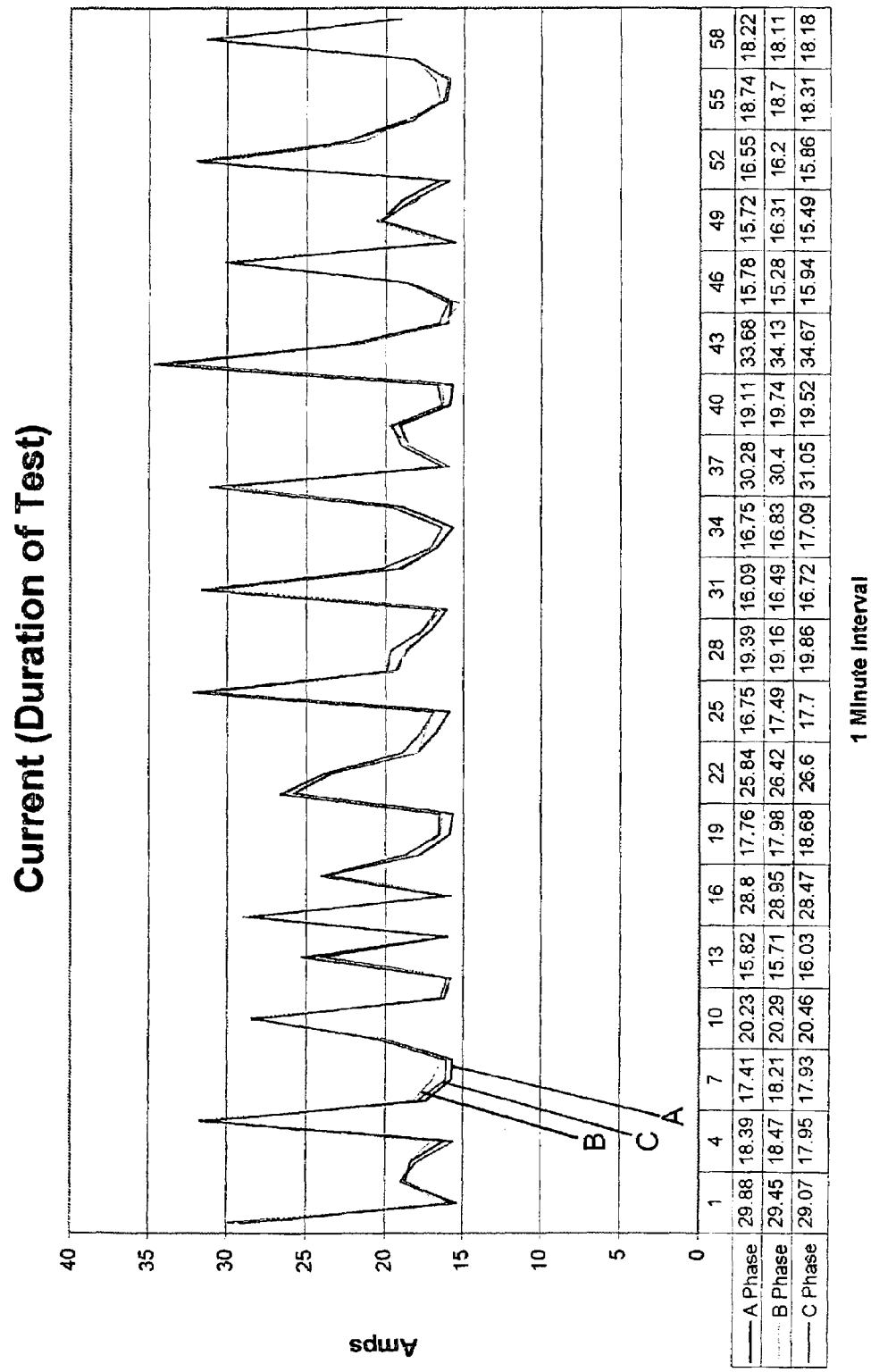
FIG. 5 is a plot of current (A) as a function of time (min) for three phases of a power supply to the 50 horsepower motor of FIG. 3 over a one-hour time period.
Figure 6:
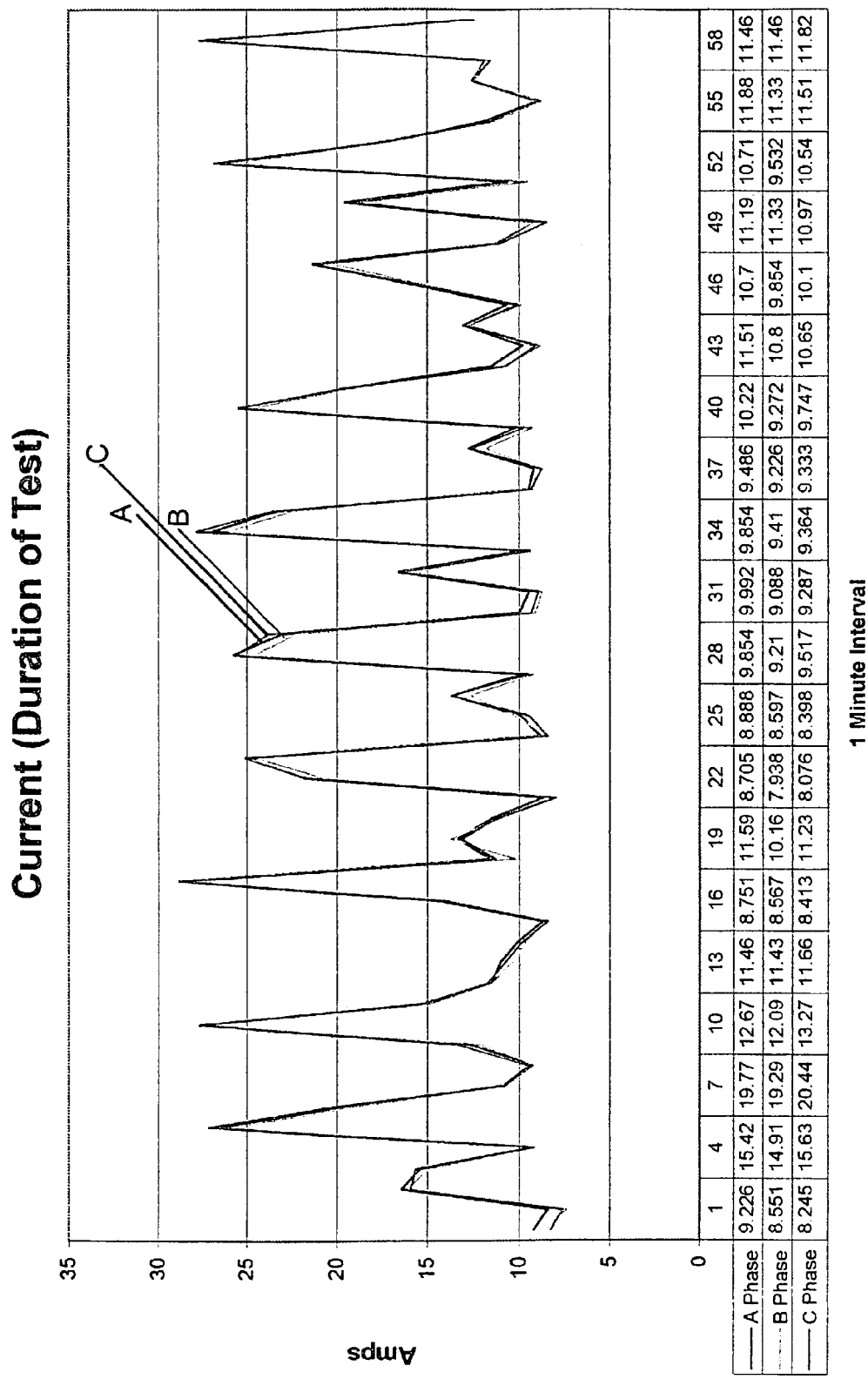
FIG. 6 is a plot of current (A) as a function of time (min) for three phases of a power supply to the 50 horsepower motor of FIG. 3 over a one-hour time period with the present invention of FIGS. 1 and 2 implemented.

Referring to FIGS. 5 and 6, current measurements across each of three phases are plotted in amperes as a function of time. FIG. 5 shows the current at the A, B and C phases before implementation of the present invention. Numerical averages are provided directly beneath the plots for each three-minute interval. These same measurements were then taken with the automated AC line filter and surge suppression apparatus implemented in the system. The results are depicted in FIG. 6. An overall comparison of current flow without implementation of the inventive apparatus (FIG. 5) to current flow with implementation of the inventive apparatus (FIG. 6) reveal a significant reduction in current flow with implementation of the present invention.

Figure 7:
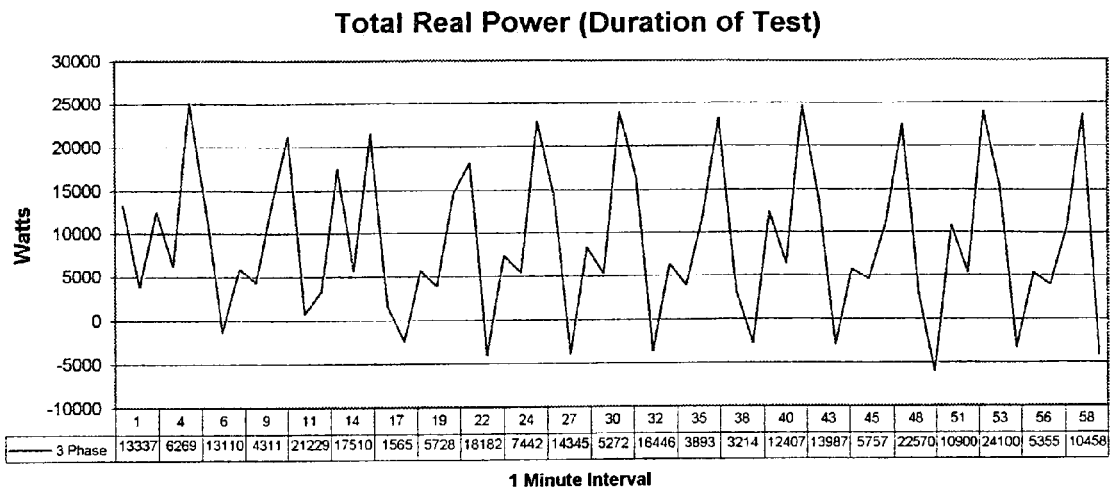
FIG. 7 is a plot of total real power (W) as a function of time (min) for the power supply to the 50 horsepower motor of FIG. 3 over a one-hour time period.
Figure 8:
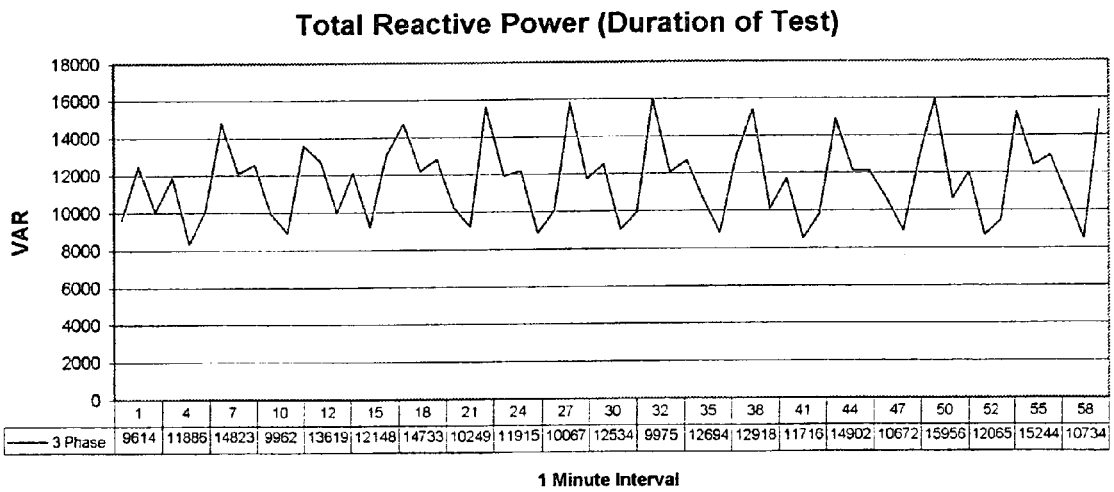
FIG. 8 is a plot of total reactive power (VAR) as a function of time (min) for the power supply to the 50 horsepower motor of FIG. 3 over a one-hour time period.

FIGS. 7 and 8 show total real power in watts plotted as a function of time, and total reactive power in VAR plotted as a function of time, without implementation of the present invention. Numerical averages are provided directly beneath the plots at two to four minute intervals.

Figure 9:
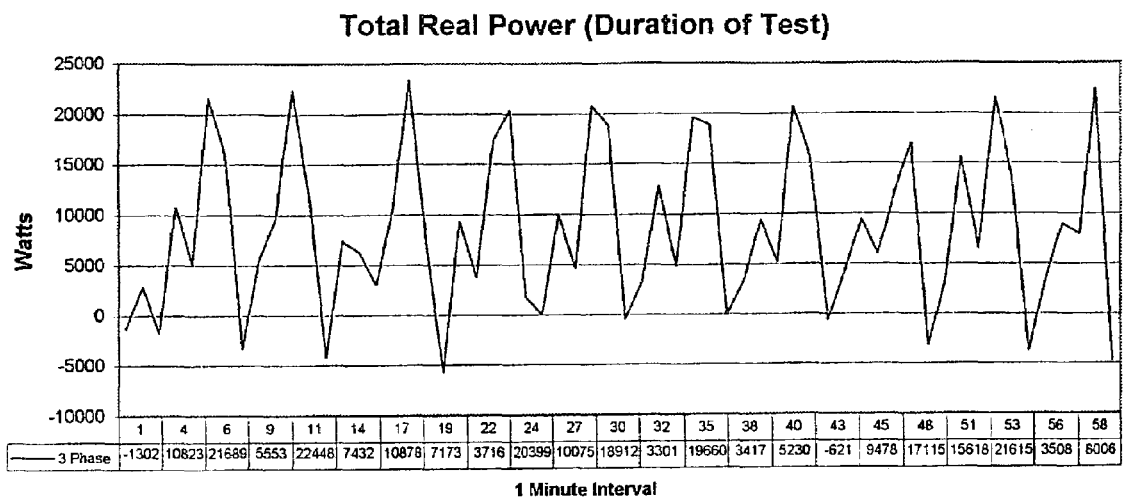
FIG. 9 is a plot of total real power (W) as a function of time (min) for the power supply to the 50 horsepower motor of FIG. 3 over a one-hour time period with the present invention of FIGS. 1 and 2 implemented.
Figure 10:
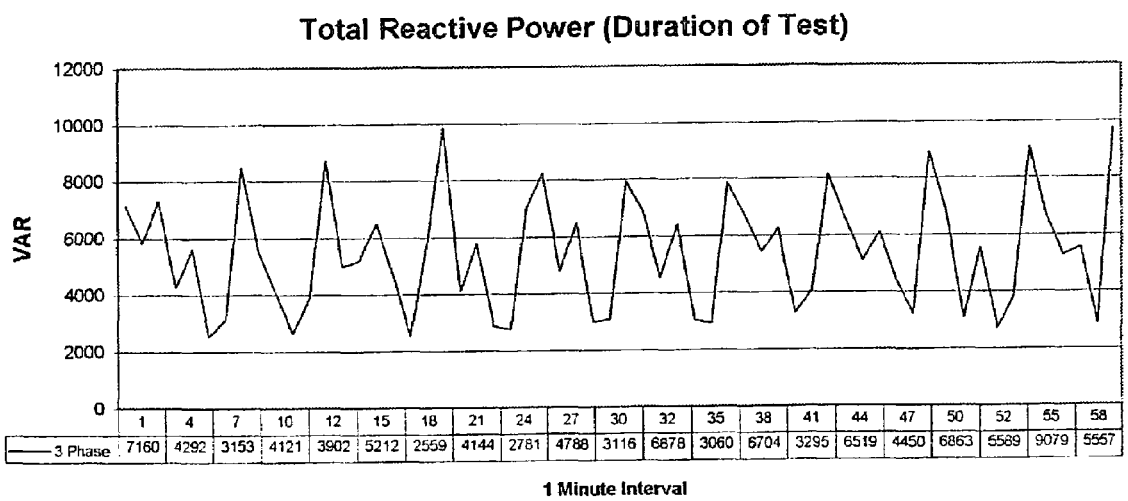
FIG. 10 is a plot of total reactive power (VAR) as a function of time (min) for the power supply to the 50 horsepower motor of FIG. 3 over a one-hour time period with the present invention of FIGS. 1 and 2 implemented.

FIGS. 9 and 10 show total real power in watts plotted as a function of time, and total reactive power in VAR plotted as a function of time, with implementation of the present invention. Numerical averages are provided directly beneath the plots at two to four minute intervals.

A comparison of total real power without the inventive apparatus (FIG. 7) to total real power with the inventive apparatus (FIG. 9) reveals a significant reduction with implementation of the present invention. For example, the maximum total real power depicted in FIG. 7 is approximately 25 kW in approximately the fifth minute of testing, while the maximum total real power depicted in FIG. 9 is approximately 23 kW in approximately the seventeenth minute of testing.

A comparison of total reactive power without the inventive apparatus (FIG. 8) to total reactive power with the inventive apparatus (FIG. 10) also reveals a significant reduction with implementation of the inventive apparatus. For example, FIG. 8 reveals total reactive power often reaching 16 kVAR, while FIG. 10 shows total reactive power not exceeding 10 kVAR with implementation of the inventive apparatus.

Test 3

A third test was performed to examine the effects of the present invention upon current, voltage, power and power factor on a 0.5 horsepower motor upon motor start-up. Measurements were taken across a single phase of the load with PowerSight™ on a Summit™ instrument.

Figure 11:
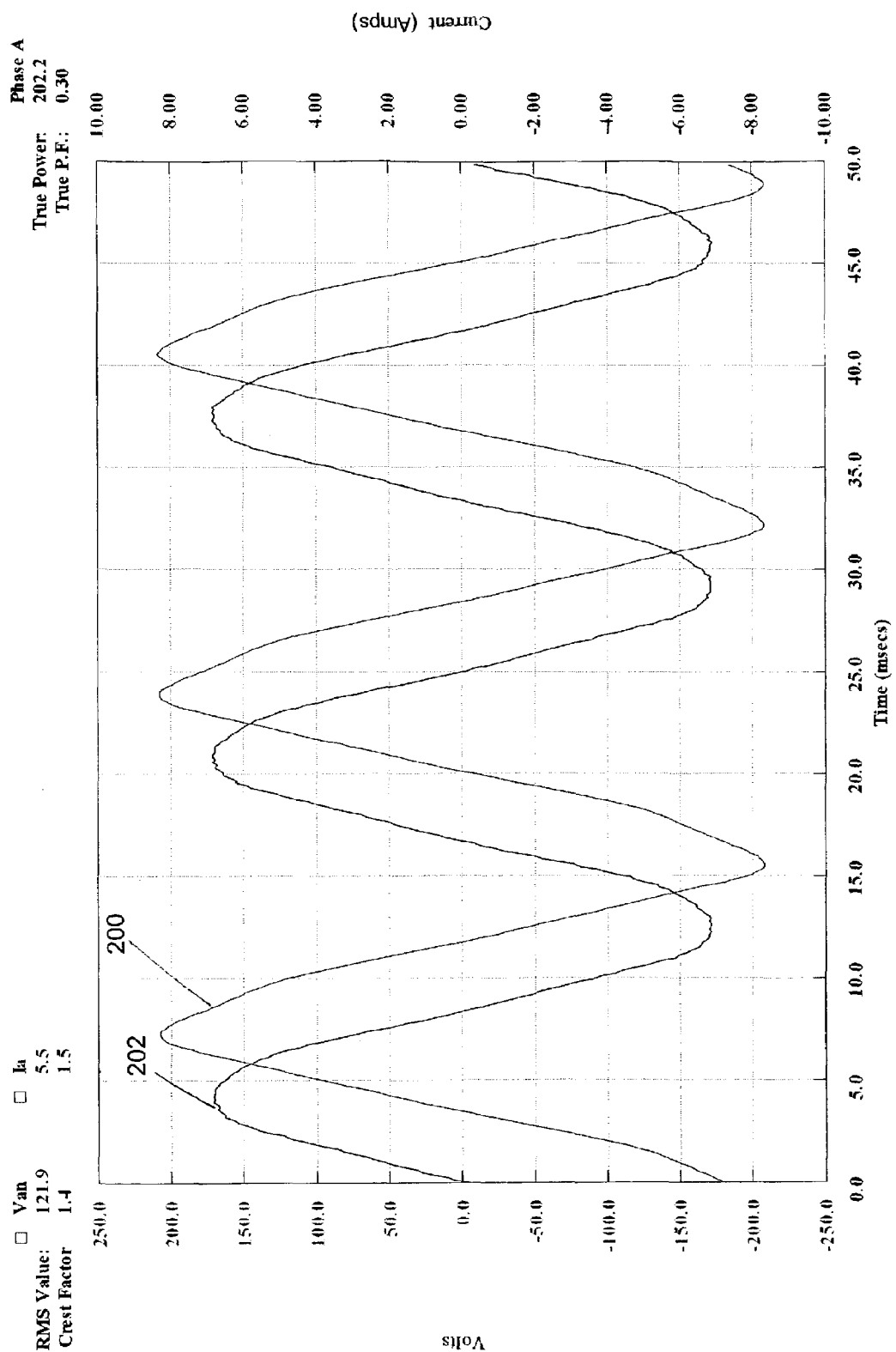
FIG. 11 is a plot of voltage (V) and current (A) in combination as a function of time (msec) upon start-up of a 0.5 horsepower motor without implementation of the present invention on the line.

Referring to FIG. 11, a plot of current 200 and voltage 202 are provided in combination as a function of time (ms) without implementation of the present invention. Voltage values are provided on the left of the graph and current values are provided on the right. Without the present invention implemented, the root-mean-square (RMS) values of voltage and current were 121.9 $V_{rms}$ and 5.5 A respectively. True power was 202.2 watts and the true power factor was 0.30.

Figure 12:
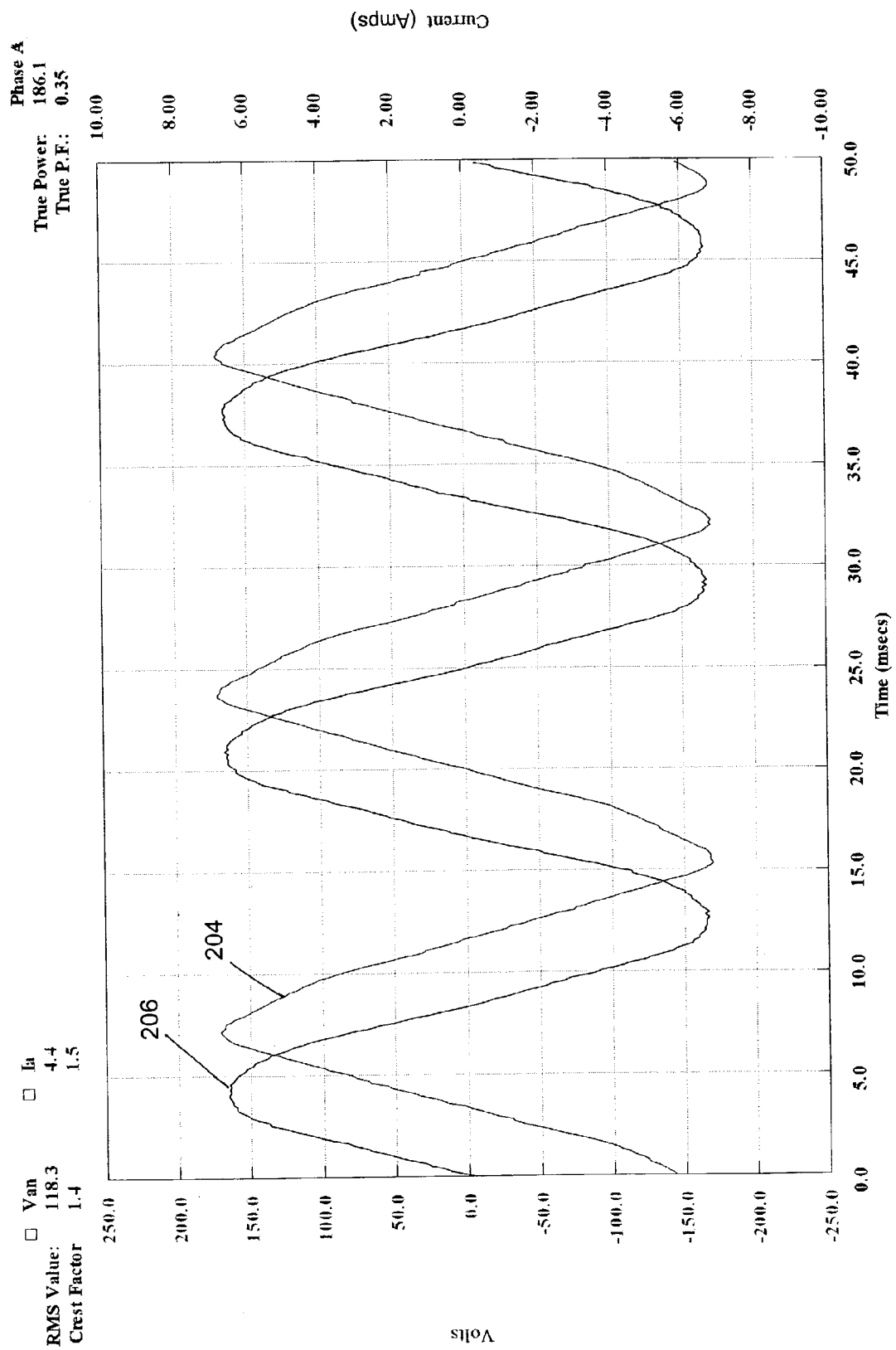
FIG. 12 is a plot of voltage (V) and current (A) in combination as a function of time (msec) upon start-up of a 0.5 horsepower motor with the present invention of FIGS. 1 and 2 implemented.

Referring to FIG. 12, a plot of current 204 and voltage 206 are provided in combination as a function of time (ms) with implementation of the present invention. Voltage values are provided on the left of the graph and current values are provided on the right. The results in FIG. 12 reveal root-mean-square (RMS) values of voltage and current were 118.3 $V_{rms}$ and 4.4 A respectively. True power was 186.1 watts and the true power factor was 0.35. With the present invention implemented, start-up current was reduced, the power factor improved and power usage decreased by 16.1 watts.

Test 4

Figure 13:
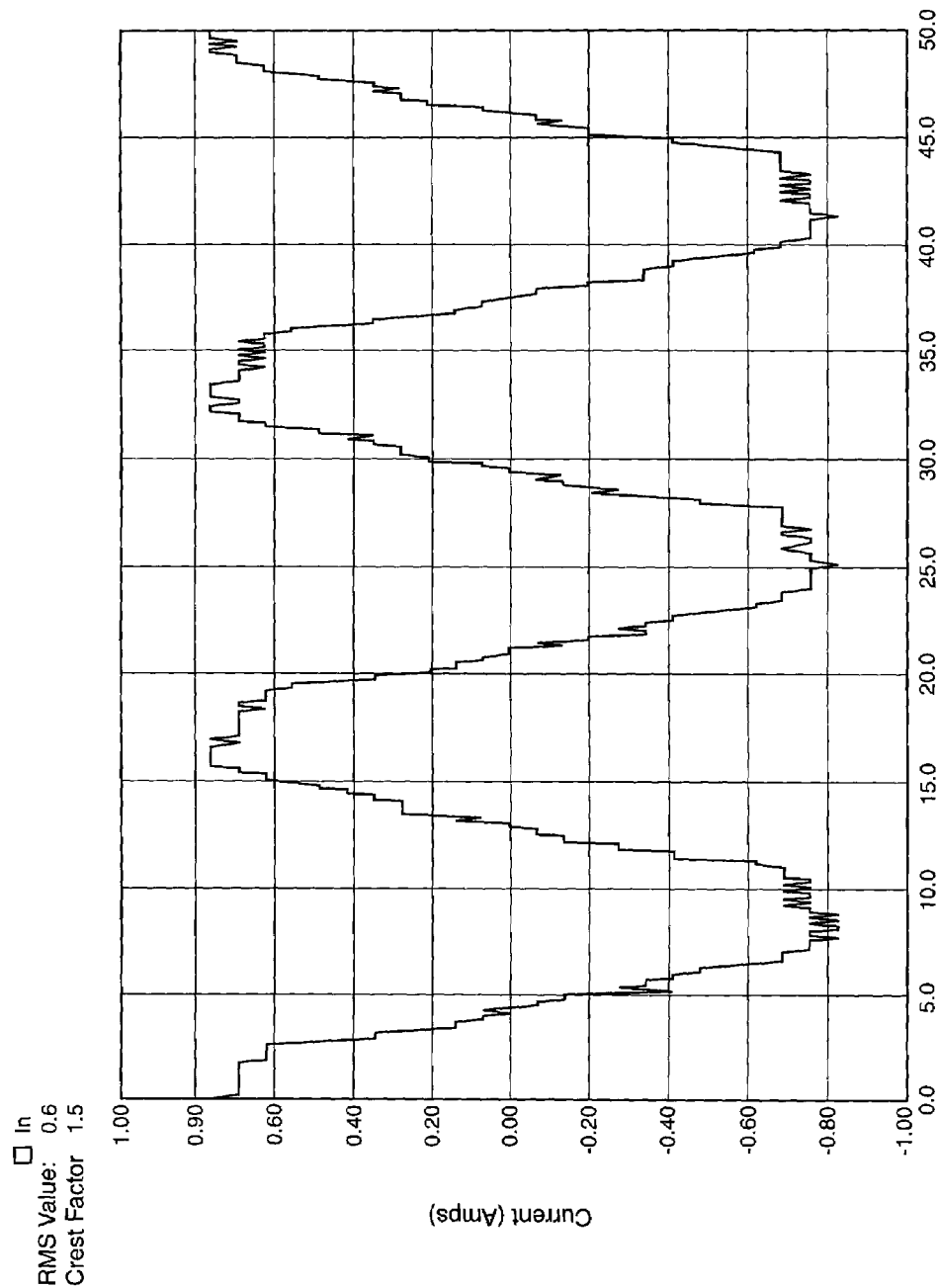
FIG. 13 is a plot of current (A) as a function of time (msec) upon startup of a 0.05 horsepower exhaust fan motor without implementation of the present invention.
Figure 14:
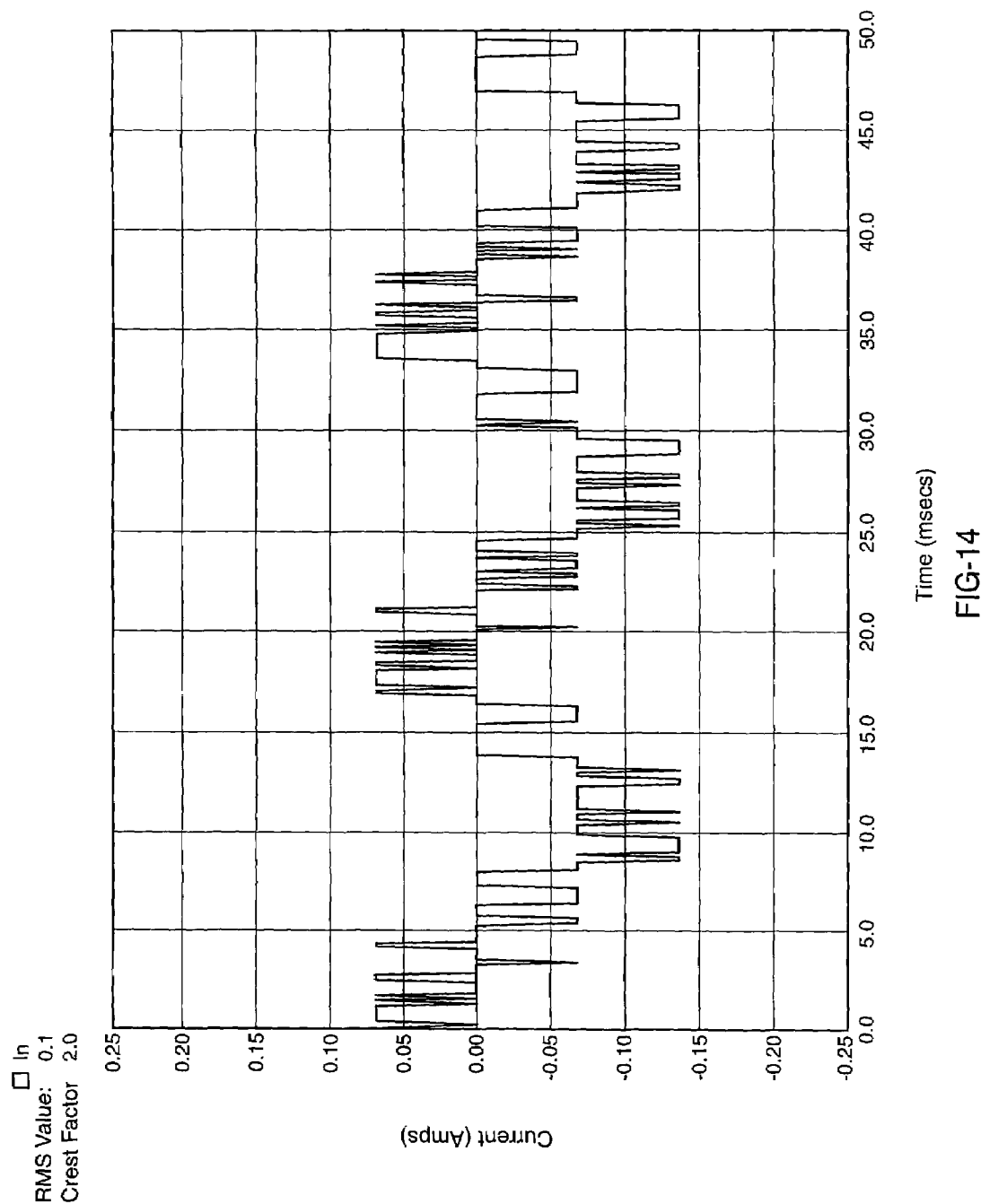
FIG. 14 is a plot of current (A) as a function of time (msec) upon startup of a 0.05 horsepower exhaust fan motor with the present invention of FIGS. 1 and 2 implemented.

Smaller loads also benefit from implementation of the present invention. Referring to FIGS. 13 and 14, plots of current draw upon start-up of a 0.05 horsepower exhaust fan motor are shown. Current measurements were taken with Summit™ instrument PowerSight™. FIG. 13 is a plot of current (A) as a function of time (ms) prior to implementation of the present invention on the line. The RMS current value during start-up was 0.6 A. FIG. 14 is a plot of current (A) as a function of time (ms) with implementation of the present invention. The RMS current value upon start-up with the present invention implemented on the line was 0.1 A revealing a significant current savings upon start-up through implementation of the present invention.

Although the invention has been described in detail with reference to this preferred embodiment, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An automated AC line filter comprising:
   an AC line filter;
   a current sensor adapted for electrical communication with an AC power line to a load for sensing a current at the load; and
   a switch mechanism in electrical communication with said current sensor and said AC line filter, said switch for providing electrical continuity between said AC line filter and the AC power line to the load upon a predetermined sensed current at said current sensor.

2. The automated line filter of claim 1 wherein said AC line filter comprises a capacitance in a range of 5 $\mu F$ to 285 $\mu F$.

3. The automated AC line filter of claim 1 wherein said current sensor comprises a current transformer.

4. The automated AC line filter of claim 1 wherein said switch mechanism comprises:
   a first switch in electrical communication with said current sensor;
   a level converter in electrical communication with said first switch; and
   a second switch in electrical communication with said level converter and said AC line filter.

5. The automated line filter of claim 4 wherein said first switch comprises a timer comprising a bi-stable flip-flop.

6. The automated line filter of claim 4 wherein said first switch comprises at least one device selected from the group consisting of flip-flops, bilateral switches, and counters.

7. The automated line filter of claim 4 wherein said level converter comprises an opto-isolator.

8. The automated line filter of claim 4 wherein said level converter comprises at least one device selected from the group consisting of transistors, digital isolators, silicon control rectifiers, solid-state relays, and photo-transistors.

9. The automated line filter of claim 4 wherein said second switch comprises a logic triac.

10. The automated line filter of claim 4 wherein said second switch comprises at least one device selected from the group consisting of electromechanical relays, solid-state relays, and power triacs.

11. A method of automatically providing AC line filtering to an AC power line to a load based on a predetermined amount of current at the load, the method comprising:

providing an AC line filter;

sensing an amount of current at the load with a current sensor; and applying AC line filtering to the AC power line to the load based upon an output from the current sensor.

12. The method of claim 11 wherein the step of applying AC line filtering comprises switching AC line filtering onto the load based upon the output from the current sensor with a switching mechanism.

13. The method of claim 11 wherein the step of applying AC line filtering comprises applying AC line filtering comprising a capacitance in the range of 5 $\mu$F to 285 $\mu$F.

14. An automated AC line filter and surge suppression apparatus comprising:

surge suppression circuitry adapted for continuous electrical communication with an AC power line to a load;

an inductive current sense loop circuit in electrical communication with an AC power line to a load, said inductive current sense loop circuit comprising:

a current sensor for sensing current at the load; and a switching mechanism in electrical communication with said current sensor, said switching mechanism for providing the application of AC line filtering upon sensing a current at the load with said current sensor; and an AC line filter in electrical communication with said switching mechanism.

15. The automated line filter of claim 14 wherein said surge suppression circuitry comprises at least one member selected from the group consisting of MOVs and capacitors.

16. The automated AC line filter and surge suppression apparatus of claim 14 wherein said AC line filter comprises a capacitance in the range of 5 $\mu$0F to 285 $\mu$F.

17. The automated AC line filter and surge suppression apparatus of claim 14 wherein said current sensor comprises a current transformer.

18. The automated AC line filter and surge suppression apparatus of claim 17 further comprising a bridge rectifier in electrical communication with said current transformer.

19. The automated AC line filter and surge suppression apparatus of claim 18 wherein said switching mechanism comprises:

a timer having a trigger input in electrical communication with an output of said bridge rectifier;

an opto-isolator having an input in electrical communication with an output of said timer; and a logic triac having an input in electrical communication with an output of said opto-isolator and having an output in electrical communication with said AC line filter.

* * * * *